(12) United States Patent
Ottati (10) Patent No.: US 6,704,764 B1
(45) Date of Patent: Mar. 9, 2004

(54) METHOD AND APPARATUS FOR A SERVLET SERVER CLASS

(75) Inventor: Michael Jay Ottati, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/115,402

(22) Filed: Jul. 14, 1998

Related U.S. Application Data (60) Provisional application No. 60/090,082, filed on Jun. 18, 1998.

(51) Int. Cl.[7] .............................................. G06F 9/00
(52) U.S. Cl. ........................... 709/100; 709/1; 709/315
(58) Field of Search ................................ 709/104, 105, 709/107.8, 203, 1, 100, 315, 316

(56) References Cited

U.S. PATENT DOCUMENTS

| | | | | |
|---|---|---|---|---|
| 5,201,049 A | * | 4/1993 | Shorter ........................ | 395/650 |
| 5,692,193 A | * | 11/1997 | Jagannathan et al. ....... | 395/676 |
| 5,870,550 A | * | 2/1999 | Wesinger, Jr. et al. .. | 395/200.48 |
| 6,182,108 B1 | * | 1/2001 | Williams et al. ............ | 709/102 |
| 6,256,637 B1 | * | 7/2001 | Venkatesh et al. ...... | 707/103 Y |
| 6,374,286 B1 | * | 4/2002 | Gee et al. ................... | 709/108 |

OTHER PUBLICATIONS

C. Berg, "How Do I Write a Java Servlet?", Dr. Dobb's Journal, Oct. 1997, pp. 121–131.*
Web article "The Java Language Specification," by James Gosling, Bill Joy and Guy Steele (First Ed., converted the printed book, Aug. 1996, first printing), HTML generated by Suzette Pelouch on Apr. 3, 1998, copyright from 1996 Sun Microsystems, Inc., URL=http://java.sun.com/docs/books/jls/html/index.html, 24 pages.

Web article "Object–Oriented Programming Concepts," http://java.sun.com/docs/books/tutorial/java/concepts/index.html, 2 pages, printed from Internet Jul. 20, 1998, a link from "The Java Tutorial: A practical guide for programmers," URL=http://java.sun.com/docs/books/tutorial/index.html, The Summer Soltice Release, last updated Jun. 26, 1998, 1 page.

Web article "Inside the Java Web Server: An Overview of Java Web Server 1.0, Java Servlets, and the JavaServer Architecture," by Phil Inje Change, last updated Jun. 24, 1998, copyright 1995–98 Sun Microsystems, Inc., URL= http://java.sun.com/features/1997/aug/jws1.html, 9 pages.

Web article "The Java Serlvet API"., copyright 1997 Sun Microsystems, Inc., URL=http://jserv.javasoft.com/products/java–server/documentation/webserver1.1/servlets/api.html, 10 pages.

Web article "Servlet Tutorial," copyright 1995–97 Sun Microsystems, Inc., URL=http://jserv.javasoft.com/productsjdk/1.2/docs/ext.servlet/servlet_tutorial.html, 13 pages.

Web article "Introduction to Servlets"., copyright 1997 Sun Microsystems, Inc., URL=http://jserv.javasoft.com/products/java–server/documentation/webserver1.1/servlets/intro.html, 2 pages.

* cited by examiner

*Primary Examiner*—Sue Lao (57) ABSTRACT

The present invention is a distributed, load balanced, fault tolerant implementation of the servlet interface. The servlet interface includes a unique JVM or instance of the SSC for each servlet thread. Hence, the interface is a system of independent programs where each is executing in its own addressable space. Since the servlet interface distributes work to multiple independent address space isolated processes, a given failure will be confined to a single process and due to the distribution of work, the present invention provides for work load balancing and scalability.

10 Claims, 8 Drawing Sheets

SERVICE PROCESS
TABLE

| PROCESS | IN USE |
|---------|--------|
| P1 | YES |
| P2 | NO |
| P3 | YES |
| P4 | NO |
| . | . |
| . | . |
| . | . |
| . | . |

700 — PROCESS column
702 — IN USE column

FIG. 7

METHOD AND APPARATUS FOR A SERVLET SERVER CLASS

CROSS-REFERENCE TO RELATED APPLICATIONS

This application relies for priority under 35 U.S.C. §1.119 (e) on U.S. Provisional Application No. 60/090,082 of Michael Ottati, entitled "Method and Apparatus for a Servlet Server Class" filed Jun. 18, 1998.

FIELD OF THE INVENTION

The present invention relates generally to a servlet interface, and more specifically for providing a scalable, fault tolerant invocation mechanism between a Webserver and Java Objects.

BACKGROUND OF THE INVENTION

The Java programming language is an object-oriented programming language. This means that all data and activity in a Java program are organized around the concept of "classes" and "interfaces." A class contains data and methods that operate on that data. When a class implements an interface, the class defines the methods of the interface. Objects are established by creating instances of classes. Further details of Java, and of object-oriented programs in general, can be found in: "The Java Tutorial: Object Oriented Programming for the Internet" by Mary Campione and Kathy Walrath, which is available in printed form and is also available at http://java.sun.com:80/docs/books/tutorial/-index.html; and "The Java Language Specification" by James Gosling, Bill Joy, and Guy Steele, which is available in printed form and is also available at http://java.sun.com:80/docs/books/jls/html/index.html. "Java" is a trademark of Sun Microsystems, Inc.

One class that exists in the Java programming languages is the java.lang.Thread class. Threads are independent pieces of logic within a Java application, or servlet. (In this document, the term application is used for both applications and servlets). Each thread executes in a single Java Virtual Machine (JVM). Although, more than one thread can be active at any one time in a virtual machine, a virtual machine generally is resident on one computer.

When a servlet executes, one or more threads run in a single process or rather a single JVM. A conventional Java Environment runs multiple threads of the same servlet or of a plurality of servlets in the same process or single JVM. Since one or more servlet threads run in a single JVM, the execution of the servlet threads occur in the same addressable space.

Running multiple servlets or threads of a servlet in the same addressable space results in a number of problems. For instance, if the execution of a particular thread corrupts the addressable space of the JVM, then the execution of other threads or servlets may also be corrupted. In a best case scenario, the corruption may halt the operation of the other threads or servlets. In a worst case scenario, the corruption may corrupt the data or output of the other threads. Since data corruption may not be readily apparent to the user, the outcome of such an event may result in long term effects that are extremely detrimental.

For example, if an airline reservation system were implemented in Java, data corruption could in theory affect an airline reservation system without notifying the affected users of the resultant errors. Such a scenario is unacceptable under standards set for today's information systems. However, conventional systems run multiple servlet threads in the same addressable space so that the possibility of such errors occurring currently exists.

SUMMARY OF THE INVENTION

The present invention overcomes the problems and disadvantages of the prior art by spreading the execution of objects over multiple JVMs, so that the failure of any one object, such as a servlet thread, will not affect an entire system. Since the processing load is distributed between multiple processes and CPU's, implementation of the present invention provides for system scalability.

More particularly, the present invention provides a "servlet server class" (SSC) that is a distributed, load balanced, fault-tolerant implementation of the servlet interface. The servlet interface includes a unique JVM or instance of the SSC for each servlet thread. Hence, the interface is a system of independent programs where each is executing in its own addressable space. Since the servlet interface distributes work to multiple independent address space isolated processes, a given failure will be confined to a single process. Furthermore, due to the distribution of work, the present invention provides for work load balancing.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

The present invention provides an implementation of a Java class called a "servlet server class" (SSC). This class is invoked by an application program in the same manner as a conventional servlet. The difference, however, is that each request to execute a servlet results in a servlet thread being run under a new and unique SSC process. Hence a new and unique JVM is provided for each thread being executed. The following paragraphs provide details of the nature and implementation of a preferred embodiment of invoking a separate JVM for each servlet thread.

Figure 1A:
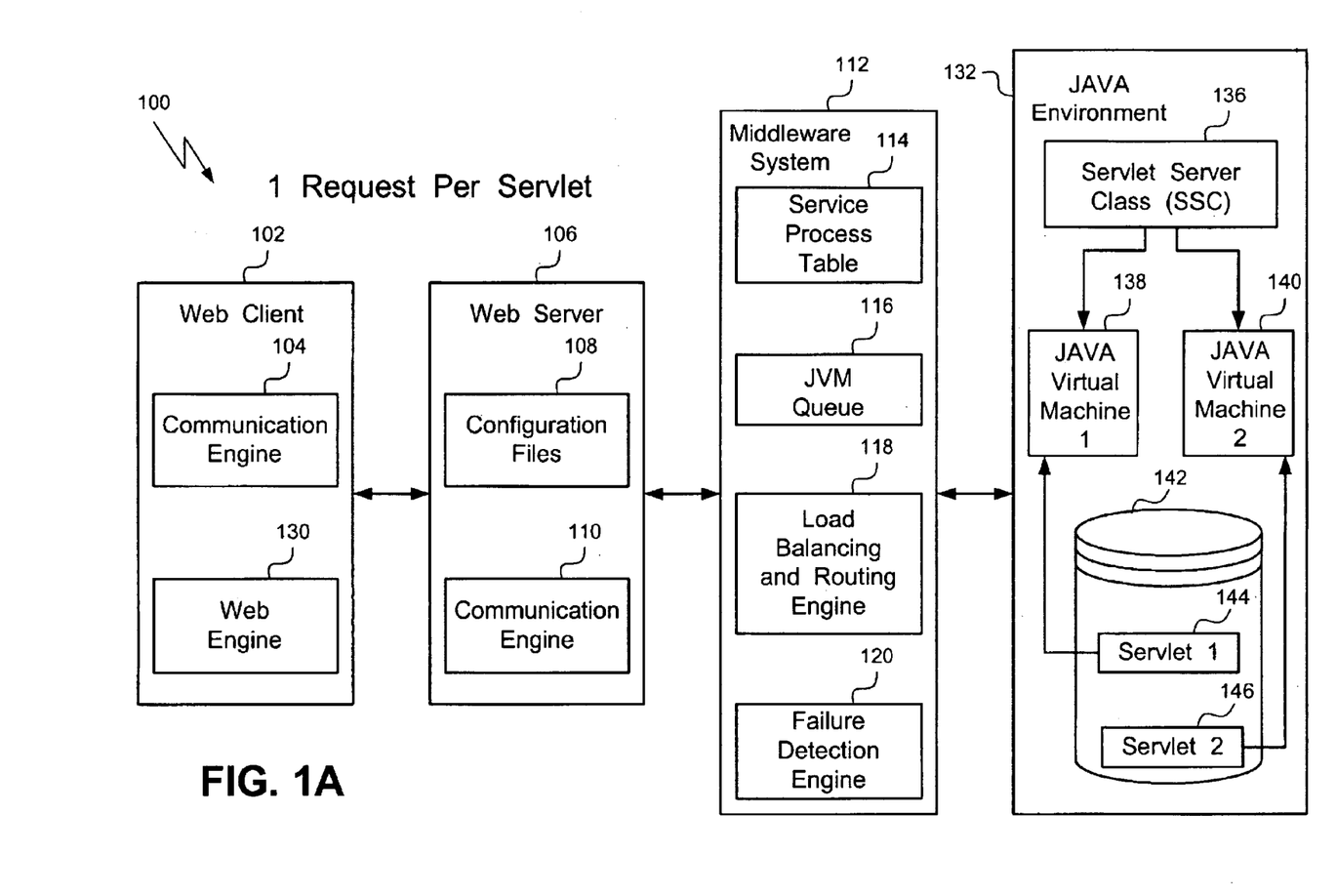
FIG. 1A is a block diagram illustrating an example of a computer system where separate requests invoke two servlets in accordance with a preferred embodiment of the present invention.

FIG. 1A is a block diagram illustrating an exemplary computer system where separate requests invoke two servlets in accordance with a preferred embodiment of the present invention. A preferred embodiment of the present System 100 comprises a web client 102 coupled directly or indirectly to a web server 106. Web server 106 is coupled directly or indirectly to a middleware system 112. Middleware system 112 is coupled directly or indirectly to a Java environment 132.

Web client 102 includes communication engine 104 and a web engine 130. Communication engine 104 sends message packets such as requests to web server 106. Web engine 130 sends servlet requests to web server 106. The requests preferably are in the form of Uniform Resource Locator (URL) requests. A URL included within the request identifies the particular resource to access. For example, the first part of the URL indicates the protocol to use and the second part specifies the IP address or the domain names where the resource is located.

In the present invention, web server 106 parses information in the URL to identify the SSC that hosts the requested servlet. Web server 106 includes configuration files 108 and communication engine 110. Web server 106 uses configuration files 108 to translate the IP address or domain name of the requested URL to a specific SSC that hosts the requested servlet. The SSC is the invocation mechanism that will be based upon the requested service provided by execution of the servlet. The new SSC process is also referred to as an instance of the JVM. Once the particular SSC and servlet are identified, communication engine 110 sends the request to be enqueued at middleware system 112.

Middleware system 112 includes a service process table 114, a JVM queue 116, a load balancing and routing engine 118 and a failure detection engine 120. When middleware system 112 instantiates the next thread on the queue, the service process table 114 determines which service process to invoke. The next thread is then dequeued from JVM queue 116. Load balancing and routing engine 118 then determines based upon resource allocation factors such as available CPUs, and current percentage loads of each CPU, where to instantiate and route the next thread. Regardless of where the next thread is instantiated, a new JVM is provided to execute the new thread.

Because a separate JVM is invoked for each new thread, each thread will execute in its own addressable space. Accordingly, if the new thread fails, regardless of the reason for failure, the failure will not affect the other threads. Hence, the focus of failure detection engine 120 is upon the failed thread, and since the threads failure does not affect the other processes, there is no need to monitor its effect upon these other processes. It should be noted that this level of fault tolerance occurs even if the threads are invoked within the same service.

An example middleware system 112 is PATHWAY or TUXEDO by Tandem Computers of Cupertino, Calif., and MICROSOFT MESSAGE QUEUES++ by Microsoft Computers of Redmond, Wash. One of ordinary skill in the art will understand that these systems are provided only as examples of middleware system 112 and that alternative middleware systems may be included in other embodiments of the present invention.

Java environment 132 includes servlet server class (SSC) 136, Java virtual machine 1 138, Java virtual machine 2 140, servlet 1 144 and servlet 2 146. One of ordinary skill in the art will understand that Java environment 132 may exist on one or more CPU's and as one or more processes, and that it is the particular implementation of the present invention that determines the outcome of the architecture of the resulting Java environment.

The SSC 136 uses information in the URL to identify the particular servlet, i.e., servlet 1 144 or servlet 2 146. For example, SSC 136 invokes servlet 1 144 by passing the requested objects for the request to servlet 1 144. The invocation of the new SSC 136 process results in the instantiation of Java virtual machine 1 138. Similarly for servlet 2 146, the invocation of this additional process results in the instantiation of Java virtual machine 2 140.

For either JVM, the SSC process replies to middleware system 112 with an output stream from the executing servlet, e.g., servlet 1 144. In turn, middleware system 112 sends the servlet output to web server 106 that returns the output to web client 102. When a servlet finishes servicing the request, it returns, allowing SSC 136 to accept a new request for the servlet or for any other servlet of the SSC hosts. It will be appreciated that since a new JVM is invoked for each request, the execution of each request occurs in separate addressable space. Accordingly, it will also be appreciated that this system architecture provides Java environment 132 fault tolerant processing, scalability, and load balancing.

Figure 1B:
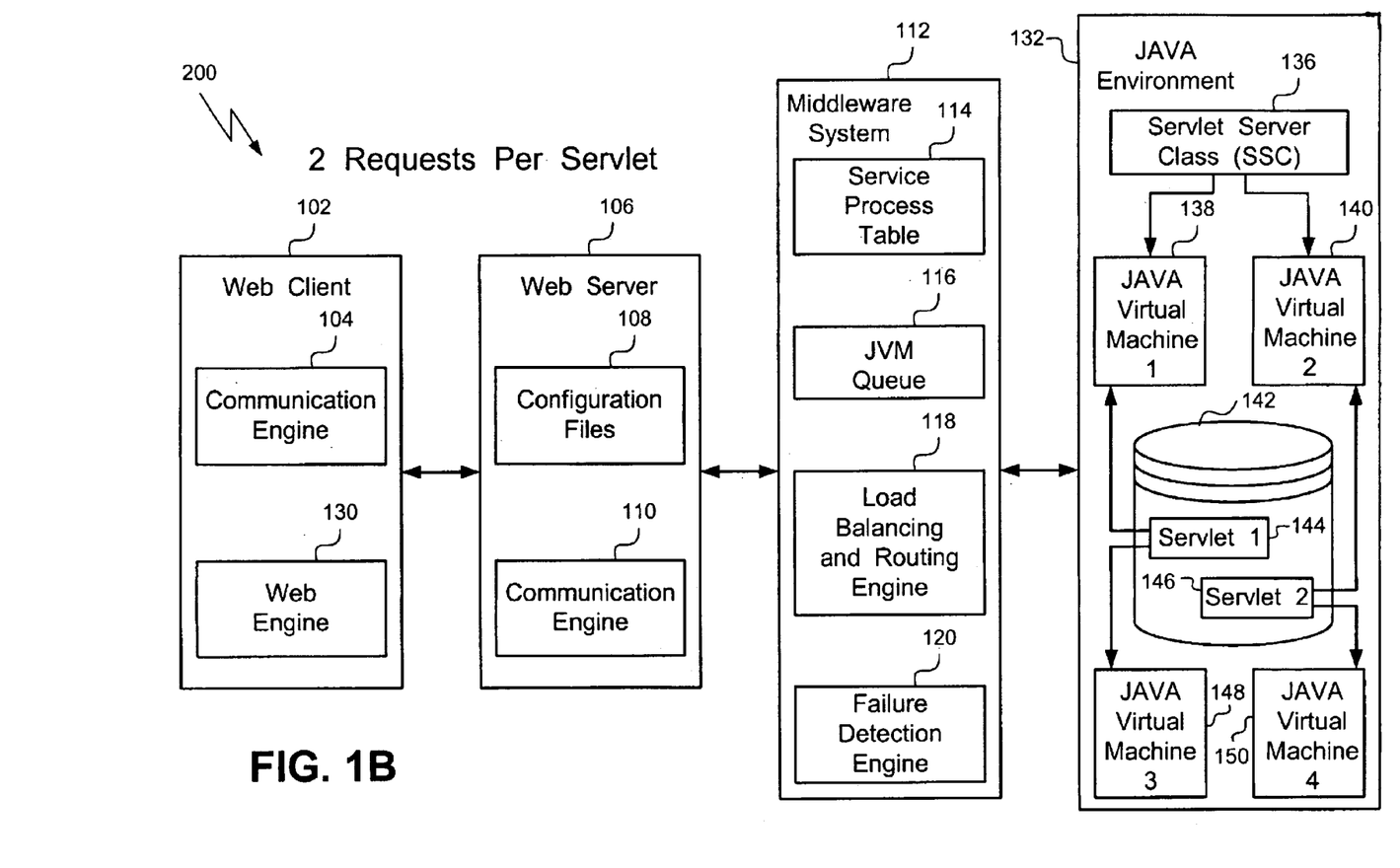
FIG. 1B is a block diagram illustrating an example of a computer system where two separate requests invoke two servlets in accordance with a preferred embodiment of the present invention.

FIG. 1B is a block diagram illustrating an exemplary computer system where two separate requests invoke two servlets in accordance with a preferred embodiment of the present invention. With the exception of the number of web client 102 requests that result in the instantiation of twice the number of JVMs, the elements of FIG. 1B are the same as the elements of FIG. 1A. More particularly, Web client 102 sends two requests per each servlet, servlet 1 144 and servlet 2 146. As discussed above, each request is routed to an instantiation of a separate JVM. Hence, the two requests that invoke servlet 1 144 instantiate Java Virtual Machine 1 138 and Java Virtual Machine 3 148. The two requests that invoke servlet 2 146 instantiate Java Virtual Machine 2 140 and Java Virtual Machine 4 150. Accordingly, the execution of each thread occurs in a separate addressable space so that a failure of one thread does not affect the execution of the remaining threads.

Figure 2:
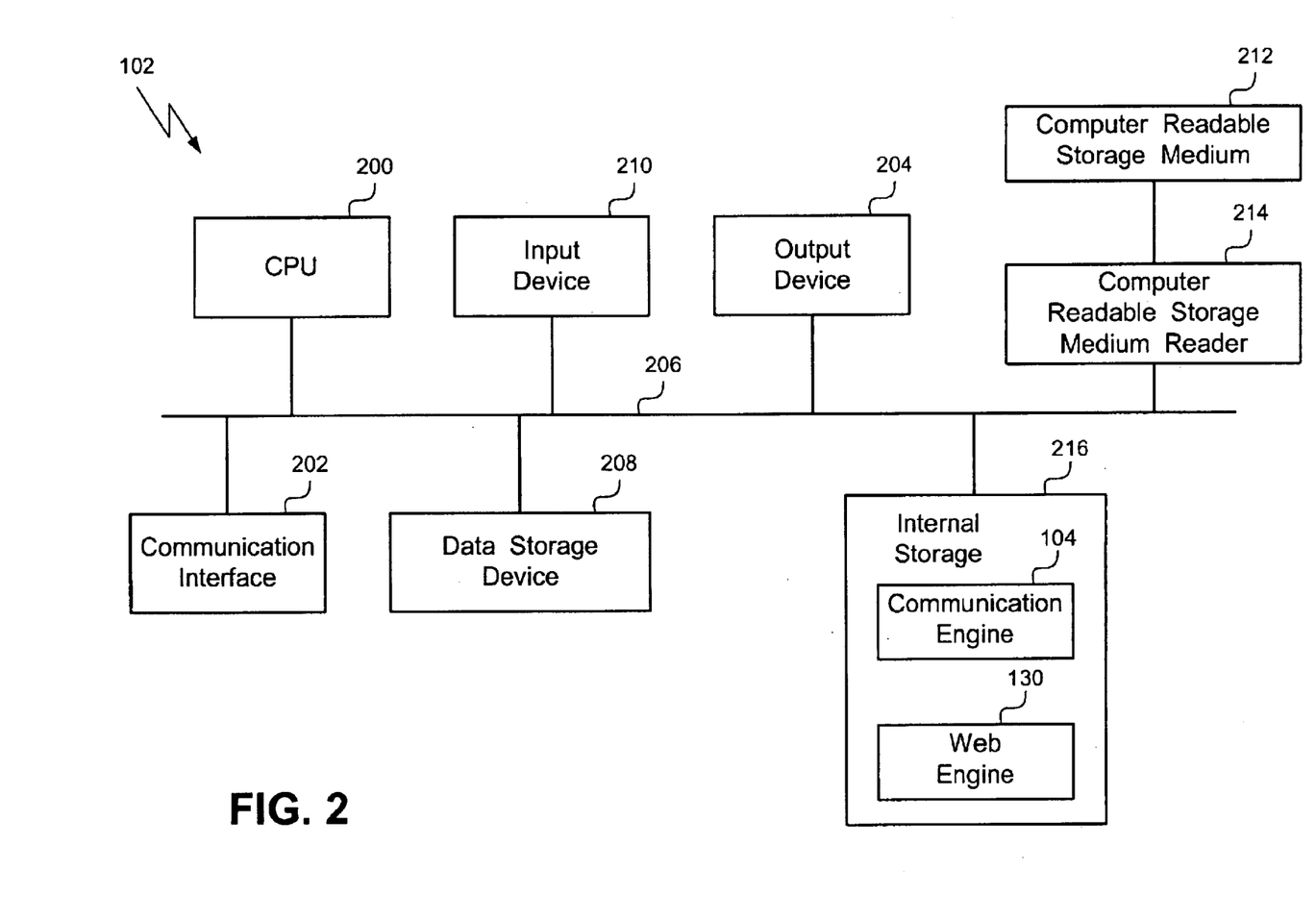
FIG. 2 is a block diagram illustrating details of a web client of the computer system of FIGS. 1A and 1B.

FIG. 2 is a block diagram illustrating details of web client computer 102. Web client 102 includes a Central Processing Unit (CPU) 200 such as a MIPS microprocessor, Motorola Power PC™ microprocessor or an Intel Pentium™ microprocessor. An Input device 204 such as a keyboard and mouse, an output device 210 such as a Cathode Ray Tube (CRT) display, and a computer readable storage medium reader 214 such as a CD ROM drive are coupled via signal bus 206 to CPU 200. Computer readable storage medium reader 214 reads from a computer readable storage medium 212 such as a CD. A Communications interface 202, a data storage device 208 such as Read Only Memory (ROM) or a magnetic disk, and Random-Access memory (RAM) are further coupled via signal bus 206 to CPU 200.

Internal storage 216 stores communication engine 104 for transferring message packets such as requests to and from web server 106 via communication interface 202. Internal storage 216 further stores a web engine 130 for sending servlet requests to web server 106. That is, the web engine 130 sends URL requests to web server 106. One of ordinary skill in the art will understand that web engine 130 is generally provided by an Internet engine such as a web browser, e.g., the Navigator™ web browser produced by the Netscape Corporation or the Internet Explorer™ web browser produced by the Microsoft Corporation.

Figure 3:
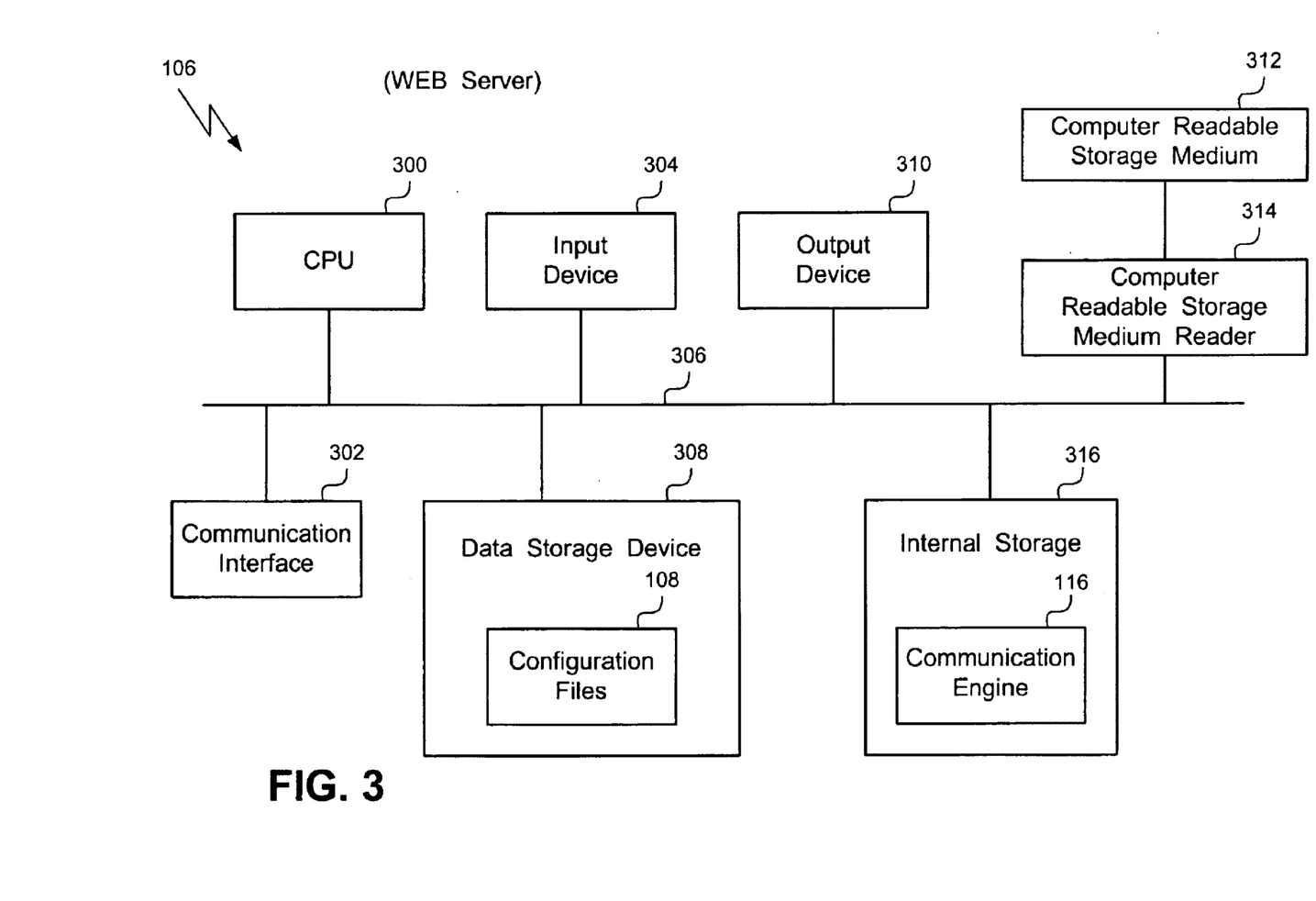
FIG. 3 is a block diagram illustrating details of a web server of the computer system of FIGS. 1A and 1B.

FIG. 3 is a block diagram illustrating details of web server computer 106. Web server 106 includes a Central Processing Unit (CPU) 300 such as a Tandem Motorola Power PC™ microprocessor or an Intel Pentium™ microprocessor. An Input device 304 such as a keyboard and mouse, an output device 210 such as a Cathode Ray Tube (CRT) display, and a computer readable storage medium reader 314 such as a CD ROM drive are coupled via signal bus 306 to CPU 200. Computer readable storage medium reader 314, reads from a computer readable storage medium 312 such as a CD. A Communications interface 302, a data storage device 308 such as Read Only Memory (ROM) or a magnetic disk, and Random-Access memory (RAM) are further coupled via signal bus 306 to CPU 300.

Data storage device 308 stores configuration files 108 for translating the IP address or domain name of the requested URL to a specific SSC that hosts the requested servlet.

Internal storage 316 stores communication engine 116 for transferring message packets such as requests to and from web client 102 and middleware system 112 via communication interface 302.

Figure 4:
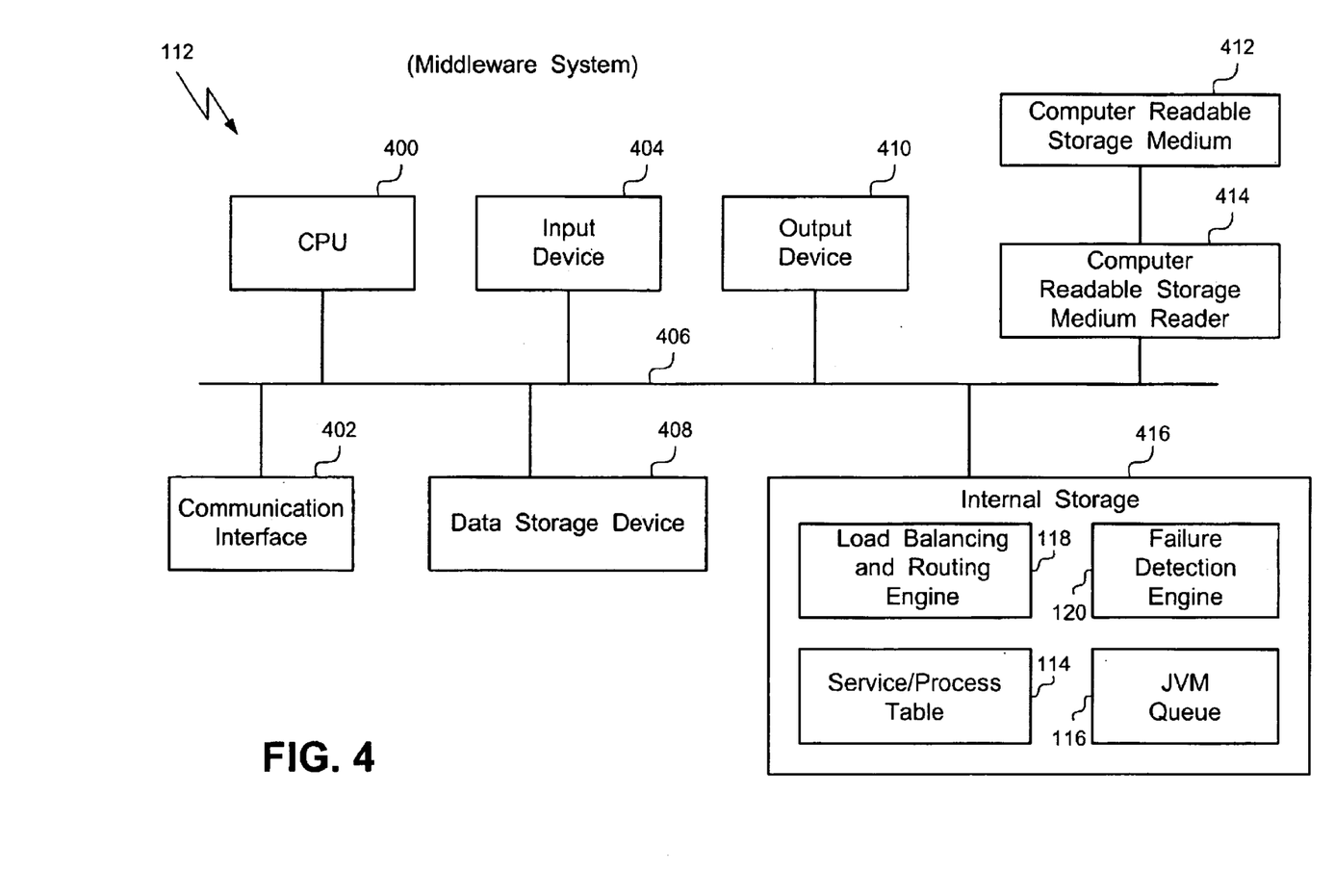
FIG. 4 is a block diagram illustrating details of a middleware system of the computer system of FIGS. 1A and 1B.

FIG. 4 is a block diagram illustrating details of middleware system 112. Middleware system 112 includes a Central Processing Unit (CPU) 400 such as a Tandem Motorola Power PC™ microprocessor or an Intel Pentium™ microprocessor. An input device 404 such as a keyboard and mouse, an output device 410 such as a Cathode Ray Tube (CRT) display, and a computer readable storage medium reader 414 such as a CD ROM drive are coupled via signal bus 406 to CPU 400. Computer readable storage medium reader 414, reads from a computer readable storage medium 412 such as a CD. A Communications interface 402, a data storage device 408 such as Read Only Memory (ROM) or a magnetic disk, and Random-Access memory (RAM) are further coupled via signal bus 406 to CPU 400.

Figure 7:
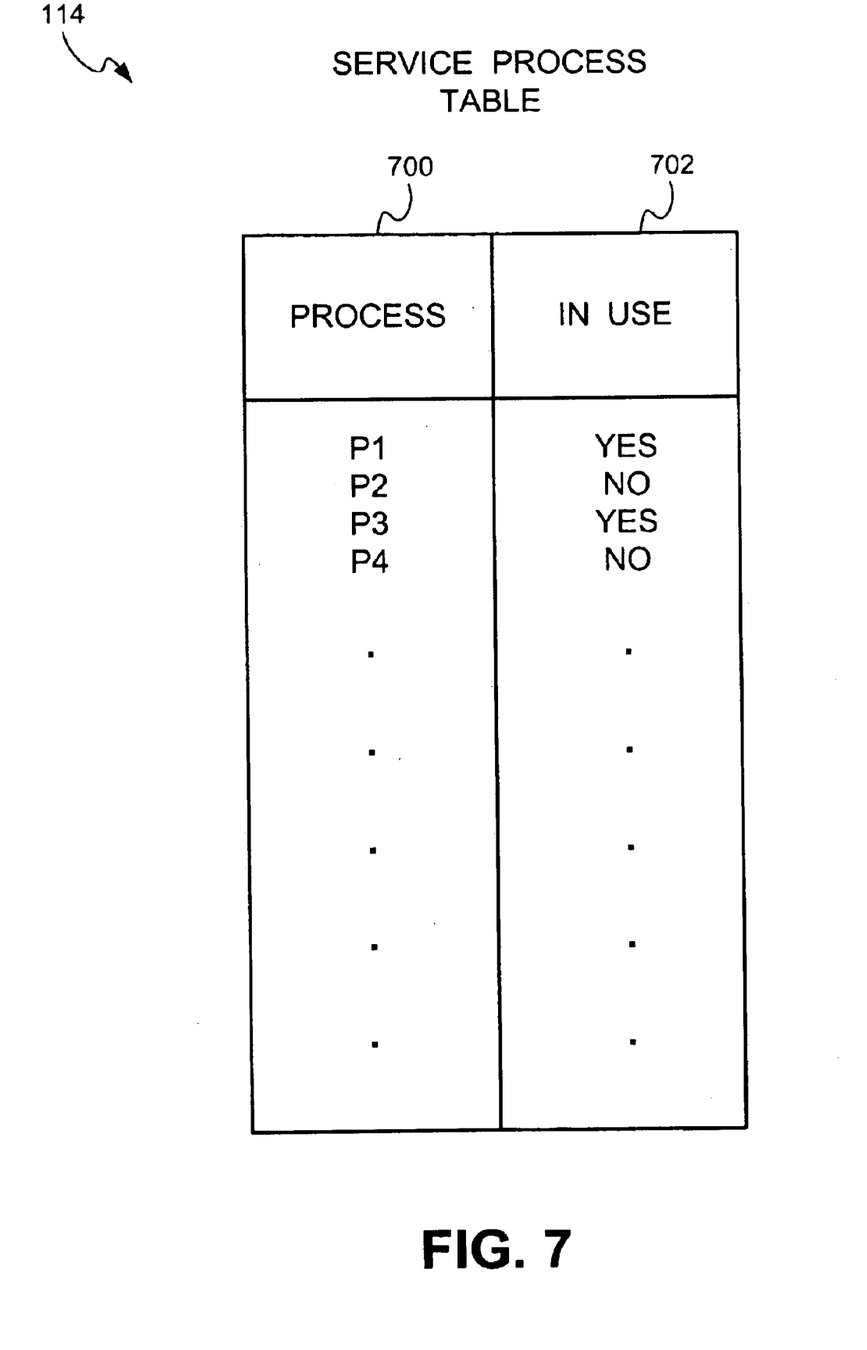
FIG. 7 is a table illustrating the Service Process Table.

Internal storage 416 stores load balancing and routing engine 118, failure detection engine 120, JVM Queue 116 and Service Process Table 114. Load balancing and routing engine 118 is used for instantiating servlets within a service according to the available capacity of processes and CPUs. Failure detection engine 120 is used to identify failed processes. The JVM queue 116 is used for queuing and dequeuing requests to execute particular servlets. Service Process Table 114 is a table for mapping servlet requests to particular JVM processes. FIG. 7 shows an example of Service Process Table 114. Service Process Table 114 includes a list of processes 700 and a corresponding "In Use" status identifier 702 for each process that indicates whether the process is currently active, or available for use.

Figure 5:
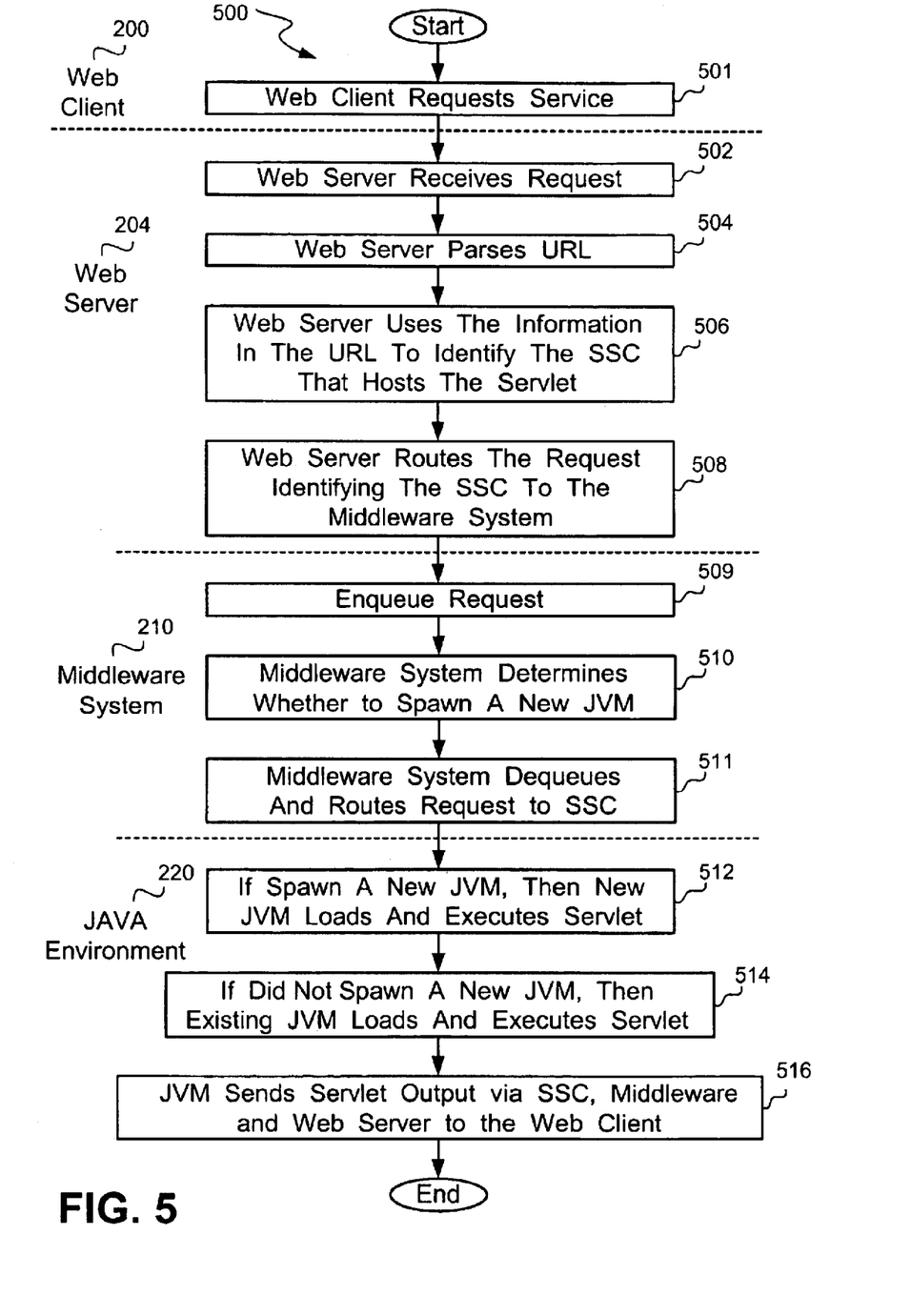
FIG. 5 is a flowchart illustrating a method of providing a unique JVM for the execution of each servlet thread in accordance with the present invention.

FIG. 5 is a flowchart illustrating a method of providing a unique JVM for the execution of each servlet thread in accordance with the present invention. Method 500 begins by web client 102 in step 501 using communication engine 104 to create a communications link with web server 106, and confirming that the user has privileges to access the functionality of web server 106. Web client 102 using web engine 130 requests service from web server 106. Each request includes a URL that specifies the address of the web client's requested resource.

Web server 106 using communication engine 110 in step 502 receives the request from web client 102. Web server 106 in step 504 uses configuration files 108 to parse the URL. After parsing the URL, web server 106 in step 506 uses the information from the URL to identify the SSC that hosts the servlet. Web server 106 in step 508 then uses communication engine 110 to route the request identifying the SSC 136 to middleware system 112.

Middleware system 112 in step 509 enqueues the request onto JVM queue 116. Middleware system 112 in step 510 then uses service process table 114 to determine whether to spawn a new JVM for the request. Service process table 114 maintains a resource list of all available and active JVMs.

Figure 6:
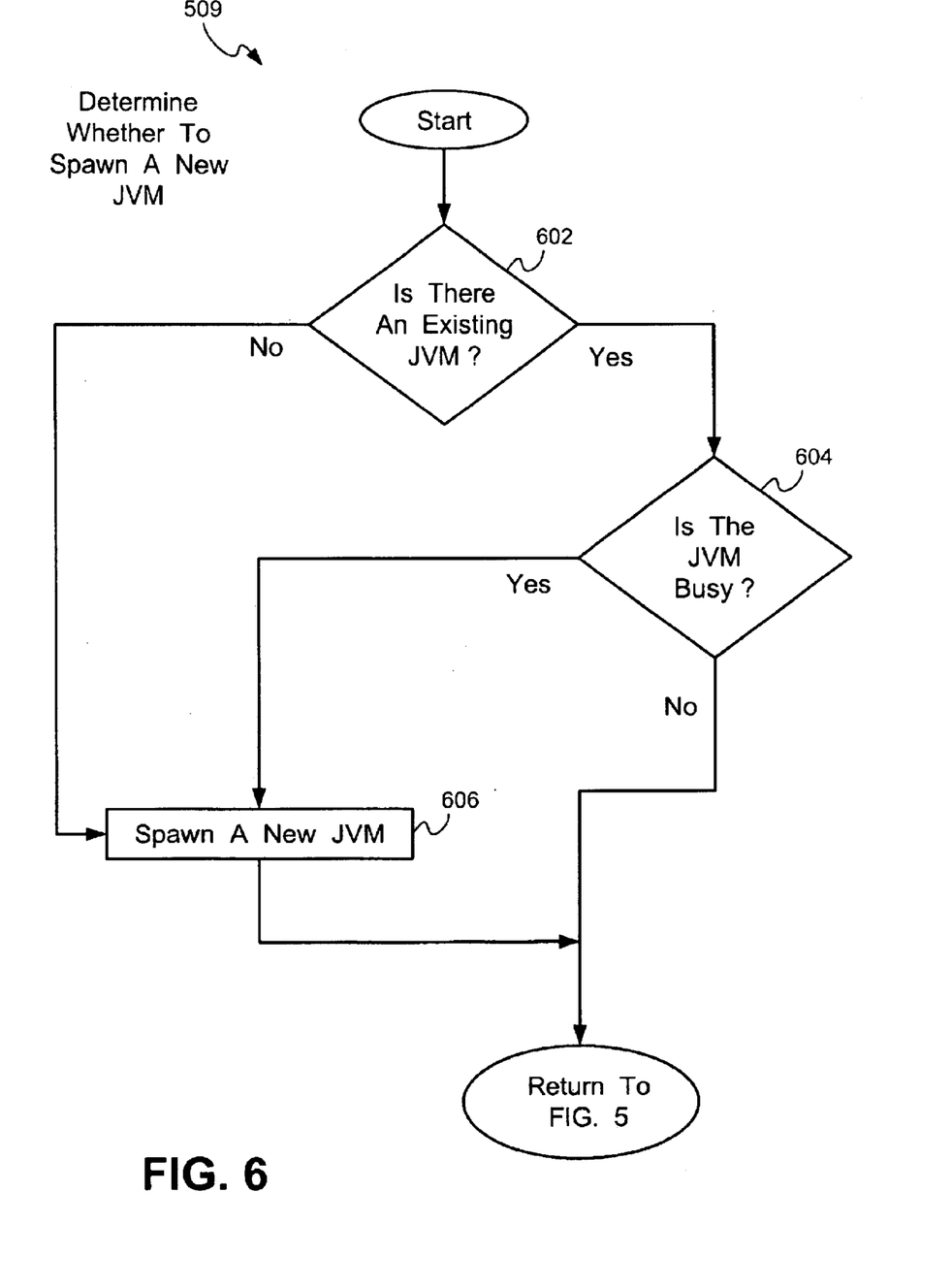
FIG. 6 is a flowchart illustrating details of the FIG. 5 step of determining whether to spawn a new JVM in accordance with the present invention.

FIG. 6 shows in detail the step of determining whether to spawn a new JVM. Middleware system 112 queries Service Process Table 114 in step 602 as to whether there is an existing JVM for the specific service requested. If there is an existing JVM then in step 604 it is determined whether the JVM is busy. If the JVM is busy then step 606 spawns a new JVM. If the JVM is not busy then control returns to FIG. 5 since the existing JVM may be used to fulfill the client request. If in step 602 there is no existing JVM then step 606 spawns a new JVM. After spawning a new JVM, the method returns to FIG. 5.

Once a separate JVM is secured for the request, in step 510 middleware system 112 dequeues and routes the request to SSC 136 of Java environment 132. If a new JVM was spawned, then in step 512, Java environment 132 loads the new JVM and executes the requested servlet, e.g., servlet 2 146. If a new JVM was not spawned then in step 514 the existing JVM loads and executes the requested servlet, e.g., servlet 1 144. Then in step 516 the JVM sends the servlet output via SSC 136, middleware system 112 and web server 106 to web client 102.

Other embodiments will be apparent to those skilled in the art from consideration of the specification and practice of the invention disclosed herein. For example, the present invention can be implemented in languages other than the Java language or in languages that are based on or similar to the Java language developed by Sun Microsystems. It is intended that the specification and examples be considered as exemplary only, with a true scope of the invention being indicated by the following claims and equivalents.

What is claimed is:

1. A method of providing a separate Java Virtual Machine for each thread in a data processing system, comprising the steps, performed by at least one processor of:

receiving a request for service;

identifying a resource requested and a class corresponding to the resource;

if a virtual machine is available then reusing the available virtual machine by a single thread only by loading the virtual machine to instantiate a thread corresponding to the requested resource, wherein a virtual machine is available if the virtual machine has a matching, process identification and thread identification and is not busy; and if a virtual machine is unavailable then spawning and loading a new virtual machine to instantiate a thread corresponding to the requested resource, wherein a virtual machine is unavailable if either the virtual machine does not have a matching process identification and thread identification or is busy.

2. The method of claim 1, further including a step of:
sending a service request by a web client.

3. The method of claim 1, wherein identifying a resource requested includes the step of:
parsing a Uniform Resource locator; and
using the Uniform Resource Locator to identify the class that hosts the program that when executed provides the resource requested.

4. The method of claim 1 further includes the step of:
enqueuing the resource request before determining if the virtual machine is available.

5. The method of claim 1 further includes the step of:
dequeuing the resource request after determining if the virtual machine is available;
routing the request to the virtual machine where the virtual machine is available; and
routing the request to the new virtual machine where the virtual machine is unavailable.

6. The method of claim 3, wherein the program is a servlet.

7. The method of claim 1, further including the step of:
sending an output stream to an origin of the request.

8. A computer data signal embodied in a carrier wave and representing sequences of instructions which, when executed by a processor, cause said processor to provide a separate Java Virtual Machine to instantiate a thread in a data processing system, by performing the steps of:
receiving a request for service;
identifying a resource requested and a class corresponding to the resource;
if a virtual machine is available, reusing the available virtual machine by a single thread only by loading the virtual machine to instantiate a thread corresponding to the requested resource, wherein a virtual machine is available if the virtual machine has a matching process identification and thread identification and is not busy; and
if a virtual machine is unavailable, spawning and loading, a new virtual machine to instantiate a thread corresponding to the requested resource, wherein a virtual machine is unavailable if either the virtual machine does not have a matching, process identification and thread identification or is busy.

9. A computer program product comprising:
a computer usable medium having computer readable code embodied wherein for causing, a unique Java Virtual Machine to instantiate a thread in a data processing, system, the computer program product including:
a first computer readable program code configured to cause a computer to effect receiving a request for service; and
the first computer readable program code configured to cause a computer to effect identifying a resource requested and a class corresponding to the resource;
the first computer readable program code configured to cause a computer to effect if a virtual machine is available, reusing the available virtual machine by a single thread only by loading the virtual machine to instantiate a thread corresponding to the requested resource, wherein a virtual machine is available if the virtual machine has a matching process identification and thread identification and is not busy; and
the first computer readable program code configured to cause a computer to effect if a virtual machine is unavailable, spawning and loading a new virtual machine to instantiate a thread corresponding to the requested resource, wherein a virtual machine is unavailable if either the virtual machine does not have a matching process identification and thread identification or is busy.

10. A method performed in a data processing system, by at least one processor, comprising:
receiving multiple requests for service from a client;
identifying a respective servlet for each of the multiple requests and a class corresponding to each of the respective servlets; and
providing a separate virtual machine for each of the respective servlets, each separate virtual machine executing in a separate addressable space, the virtual machine providing step further including: if a virtual machine is available then reusing the available virtual machine by a single thread only by loading the virtual machine to instantiate a thread correspond to the requested service, wherein a virtual machine is available if the virtual machine has a matching process identification and thread identification and is not busy, and
if no virtual machine is available then spawning and loading a new virtual machine to instantiate a thread corresponding to the requested resource, wherein no virtual machine is available if either the virtual machine does not have a matching process identification and thread identification or is busy.

* * * * *